United States Patent
Hage-Hassan et al.

(10) Patent No.: US 9,027,994 B2
(45) Date of Patent: May 12, 2015

(54) LOCKING STRUCTURE FOR SKIN TERMINALS OF VEHICLE SEAT AND VEHICLE SEAT PROVIDED WITH LOCKING STRUCTURE

(71) Applicant: TS Tech Co., Ltd., Saitama (JP)

(72) Inventors: Souheil Hage-Hassan, Reynoldsburg, OH (US); Eiji Toba, Reynoldsburg, OH (US)

(73) Assignee: TS Tech Co., Ltd., Saitama (JP)

( * ) Notice: Subject to any disclaimer, the term of this patent is extended or adjusted under 35 U.S.C. 154(b) by 196 days.

(21) Appl. No.: 13/731,487

(22) Filed: Dec. 31, 2012

(65) Prior Publication Data
US 2014/0183913 A1     Jul. 3, 2014

(51) Int. Cl.
*A47C 31/00*     (2006.01)
*B60N 2/58*     (2006.01)

(52) U.S. Cl.
CPC ................... *B60N 2/5825* (2013.01)

(58) Field of Classification Search
USPC .............. 297/218.1, 218.3, 218.5, 228.13, 297/452.59
See application file for complete search history.

(56) References Cited

U.S. PATENT DOCUMENTS

| | | | | |
|---|---|---|---|---|
| 2,612,213 | A * | 9/1952 | Bott | .................................. 5/402 |
| 3,981,534 | A * | 9/1976 | Wilton | ....................... 297/218.1 |
| 4,284,305 | A * | 8/1981 | Porter et al. | ............. 297/452.59 |
| 4,715,651 | A * | 12/1987 | Wakamatsu | ................ 297/218.1 |
| 5,401,075 | A * | 3/1995 | Venuto et al. | .............. 297/218.2 |
| 5,478,134 | A * | 12/1995 | Bernard et al. | ............ 297/218.1 |
| 5,503,454 | A | 4/1996 | Sakamoto | |
| 6,857,699 | B2 * | 2/2005 | Ashton et al. | .................. 297/220 |
| 6,981,748 | B2 * | 1/2006 | Garnweidner et al. | .. 297/452.18 |
| 7,040,834 | B2 * | 5/2006 | Nardi | .............................. 403/329 |
| 8,128,166 | B2 * | 3/2012 | Hoshina et al. | ............ 297/218.4 |
| 8,157,324 | B2 * | 4/2012 | Matsuzaki et al. | ......... 297/218.1 |
| 8,240,759 | B2 * | 8/2012 | Hobl et al. | ................. 297/218.1 |
| 8,733,834 | B2 * | 5/2014 | Palmer | ....................... 297/218.5 |
| 2010/0259079 | A1 * | 10/2010 | Matsuzaki et al. | ......... 297/218.2 |

FOREIGN PATENT DOCUMENTS

| | | | | |
|---|---|---|---|---|
| DE | 3535353 A1 * | 4/1986 | ............. | A47C 31/02 |
| DE | 3732836 C1 * | 12/1988 | ............... | B60N 1/00 |

* cited by examiner

*Primary Examiner* — David E Allred
(74) *Attorney, Agent, or Firm* — Drinker Biddle & Reath LLP (57) ABSTRACT

A structure is provided to improve rigidity of a locking structure for skin terminals of a vehicle seat. The locking structure for the skin terminals of the vehicle seat includes a seat frame having a tucking groove on an outer surface, a skin terminal of a skin for covering the seat frame, a holding member fixed to the skin terminal, a carpet terminal surrounded by the holding member, and a cut and bent portion for regulating detachment of the holding member. The skin terminal and the carpet terminal are locked in the tucking groove. The holding member is provided with a projection portion, and the carpet terminal is provided with an engagement member engaged with the projection portion for regulating detachment from the holding member. The projection portion is provided closer to the opening side of the tucking groove than the engagement member.

10 Claims, 5 Drawing Sheets

LOCKING STRUCTURE FOR SKIN TERMINALS OF VEHICLE SEAT AND VEHICLE SEAT PROVIDED WITH LOCKING STRUCTURE

BACKGROUND

Disclosed herein is a locking structure for skin terminals in a seat back of a vehicle seat, particularly to a vehicle rear seat, and a vehicle rear seat provided with a locking structure.

A seat back of a vehicle seat in the related art, such as an automobile rear seat, is formed by placing a cushion material into a frame and covering it with a skin. It is known that in order to dispose loads or the like on a back surface when the seat back is folded forward onto a seat cushion, a planar carpet is adhered on the back surface side of the frame.

As a structure for locking a terminal of the skin of such a seat back and a terminal of the carpet, there is a proposed structure for locking a skin terminal onto a back surface of a frame by inserting a retainer fixed to the skin terminal into a tucking groove formed on the back surface of the frame and nipping a carpet terminal in the tucking groove by this retainer (for example, refer to U.S. Pat. No. 5,503,454 ("the '454 patent")).

Figure 5:
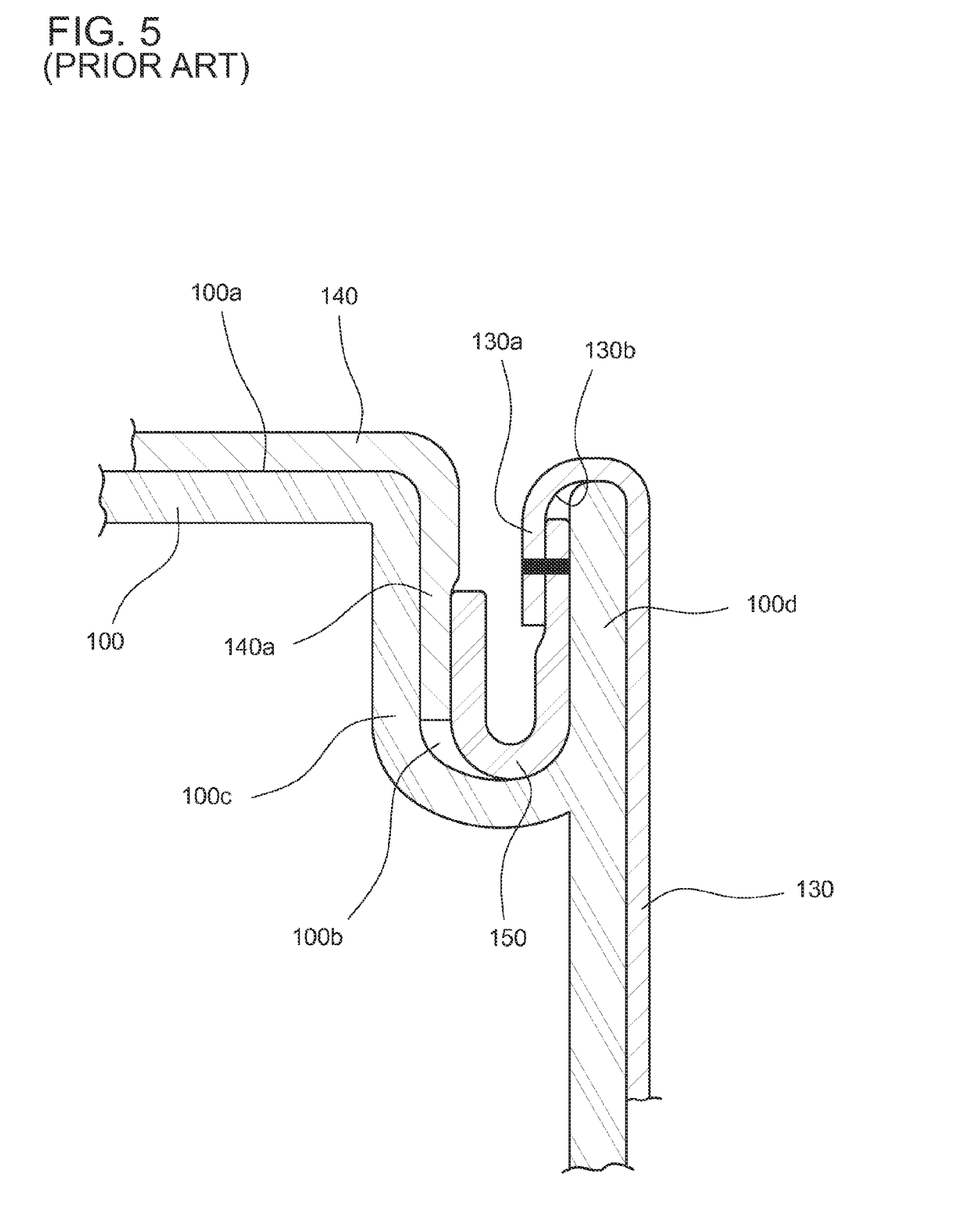
FIG. 5 is an illustrative sectional view showing an example in the related art.

In the structure described in the '454 patent, as shown in FIG. 5, a retainer 150 having a J-shaped section is sewed and fixed to a terminal 130a of a skin 130 along a back surface 130b of the skin 130. When being inserted into a tucking groove 100b formed on a planar back surface 100a of a frame 100, the retainer 150 is fixed in the tucking groove 100b by a repulsive force of the retainer 150. This tucking groove 100b has a U-shaped section including an inner wall 100c and an outer wall 100d, and is formed along an entire outer edge on the back surface 100a of the frame 100.

A carpet 140 is integrally applied and attached to the back surface 100a of the frame 100. A terminal 140a of the carpet 140 is applied along the inner wall 100c in the tucking groove 100b. The terminal 130a of the skin 130 is fixed in the tucking groove 100b by inserting and fixing the retainer 150 into the tucking groove 100b. The terminal 140a of the carpet 140 is nipped by the retainer 150 and the inner wall 100c and fixed in the tucking groove 100b.

However, in the locking structure as in the '454 patent, although the skin terminal 130a is fixed to the frame back surface 100a and the carpet terminal 140a is nipped by the frame back surface 100a by inserting the retainer 150 fixed to the skin terminal 130a into the tucking groove 100b of the frame back surface 100a, the retainer 150 is only inserted into the tucking groove 100b. Thus, in a case where a force in the direction in which the retainer 150 is pulled out is applied to the skin 130 from the outside, there is a fear that the retainer is removed from the tucking groove 100b. Therefore, further rigidity improvement in the locking structure for the skin terminals is desired.

In this locking structure, the tucking groove 100b is not provided with a guide portion for inserting the skin terminal 130a and the carpet terminal 140a. Therefore, at the time of inserting the skin terminal 130a and the carpet terminal 140a into the tucking groove 100b, further improvement in workability is desired.

Further, in this locking structure, the retainer 150 fixed to the skin terminal 130a is inserted and fixed into the tucking groove 100b. Thus, further compact arrangement and downsizing are desired.

SUMMARY

The embodiments of the present invention described below consider the above problems, and an object of the assemblies described below is to provide a locking structure for skin terminals of a vehicle seat and a vehicle seat provided with a locking structure in which rigidity of the locking structure for the skin terminals is improved.

Another object is to provide a locking structure for skin terminals of a vehicle seat and a vehicle seat provided with a locking structure in which workability at the time of locking the skin terminals is improved.

The other object is to provide a locking structure for skin terminals of a vehicle seat and a vehicle seat provided with a locking structure in which compact arrangement and downsizing are achieved.

The above problems are solved by a locking structure for skin terminals of a vehicle seat, including a seat frame having a tucking groove on an outer surface, a terminal of one skin for covering the seat frame, a holding member fixed to the terminal of the one skin, a terminal of the other skin surrounded by the holding member, and a separation regulating portion for regulating detachment of the holding member, wherein the terminal of the one skin and the terminal of the other skin are locked in the tucking groove, the holding member is provided with first and second wall portions facing each other, and a coupling portion for coupling the first and second wall portions, the first wall portion is provided with a projection portion protruding toward the side of the second wall portion, the terminal of the other skin is provided with an engagement member engaged with the projection portion for regulating detachment of the terminal of the other skin from the holding member, the projection portion is provided closer to the opening side of the tucking groove than the engagement member, and the separation regulating portion is arranged closer to the opening side of the tucking groove than the projection portion and provided to be abutted with the projection portion.

In such a way, the terminal of the one skin for covering the seat frame, the holding member fixed to the terminal of the one skin, and the terminal of the other skin surrounded by the holding member are provided, and the terminal of the one skin and the terminal of the other skin are locked in the tucking groove. Thus, the rigidity of the locking structure can be improved.

The terminal of the other skin is provided with the engagement member engaged with the projection portion for regulating the detachment of the terminal of the other skin from the holding member, and the projection portion is provided closer to the opening side of the tucking groove than the engagement member. Thus, the projection portion can regulate the detachment of the terminal of the other skin so that the rigidity of the locking structure can further be improved.

Further, the separation regulating portion is arranged closer to the opening side of the tucking groove than the projection portion and provided to be abutted with the projection portion. Thus, even when a force in the detaching direction is applied to the holding member by applying a force in the direction in which the terminal of the one skin and the terminal of the other skin are detached, the separation regulating portion is abutted with the projection portion to regulate the detachment of the holding member so that the rigidity of the locking structure can further be improved.

The tucking groove may be provided with a guide portion for guiding the terminal of the one skin and the terminal of the other skin into the tucking groove, and the guide portion may be formed from the separation regulating portion.

In such a way, the tucking groove is provided with the guide portion. Thus, the skin terminal can easily be tucked into the tucking groove so that the workability of tucking is improved.

The separation regulating portion may include a cut and bent portion provided in either the first or second wall portion of the tucking groove.

In such a way, the separation regulating portion includes the cut and bent portion provided in the wall portion of the tucking groove. Thus, the separation regulating portion can easily be formed by cutting and bending the wall portion of the tucking groove so that the workability is improved.

A front end of the cut and bent portion may be positioned between the first wall portion and the second wall portion.

In such a way, the front end of the cut and bent portion is positioned between the first wall portion and the second wall portion. Thus, the compact arrangement and the downsizing can be achieved for the entire tucking groove.

The tucking groove may be provided with a hole formed by the cut and bent portion, and a movement regulating portion provided in the first or second wall portion provided with the cut and bent portion, the hole and the projection portion may face each other, the projection portion may be arranged at a position where the projection portion is movable to the hole side upon being abutted with the cut and bent portion, and the movement regulating portion may regulate movement of at least a lower position of the projection portion to the hole side.

In such a way, the hole and the projection portion face each other, and the projection portion is arranged at the position where the projection portion is movable to the hole side upon being abutted with the cut and bent portion. Thus, even when the force in the detaching direction is applied to the holding member, the projection portion is abutted with the cut and bent portion and the projection portion is movable to the hole side. Therefore, the detachment of the holding member can be regulated so that the rigidity of the locking structure can further be improved.

The movement regulating portion regulates the movement of at least the lower position of the projection portion to the hole side. Thus, excessive movement of the projection portion to the hole side can be regulated so that the a state where the holding member surrounds the terminal of the other skin can be maintained. Therefore, the rigidity of the locking structure can further be improved.

The projection portion may be provided closer to the side of the terminal of the other skin than an end on the hole side of an end surface of the cut and bent portion, and the projection portion may be provided to be abutted with the end surface of the cut and bent portion.

With such a configuration, by abutting the projection portion with the end surface of the separation regulating portion, the projection portion is easily moved to the side of the terminal of the other skin and the holding member can further easily surround the terminal of the other skin. Thus, the rigidity of the locking structure can further be improved.

A vehicle seat including the locking structure according to any of the embodiments described below may be formed.

With such a configuration, the vehicle seat in which the rigidity of the locking structure for the skin terminals is improved can be obtained.

DETAILED DESCRIPTION

Hereinafter, an embodiment of the present invention will be described with reference to the drawings. Members, arrangement, and the like described below do not limit the present invention but can be variously modified along the gist of the present invention.

The present embodiment of the invention relates to a locking structure for skin terminals in a seat back of a vehicle rear seat. Although a description will be given based on the seat back of the vehicle rear seat in the present embodiment, the invention is not limited to this but also applicable to any seat parts covered with a skin such as a vehicle front seat and a vehicle middle seat.

Figure 1:
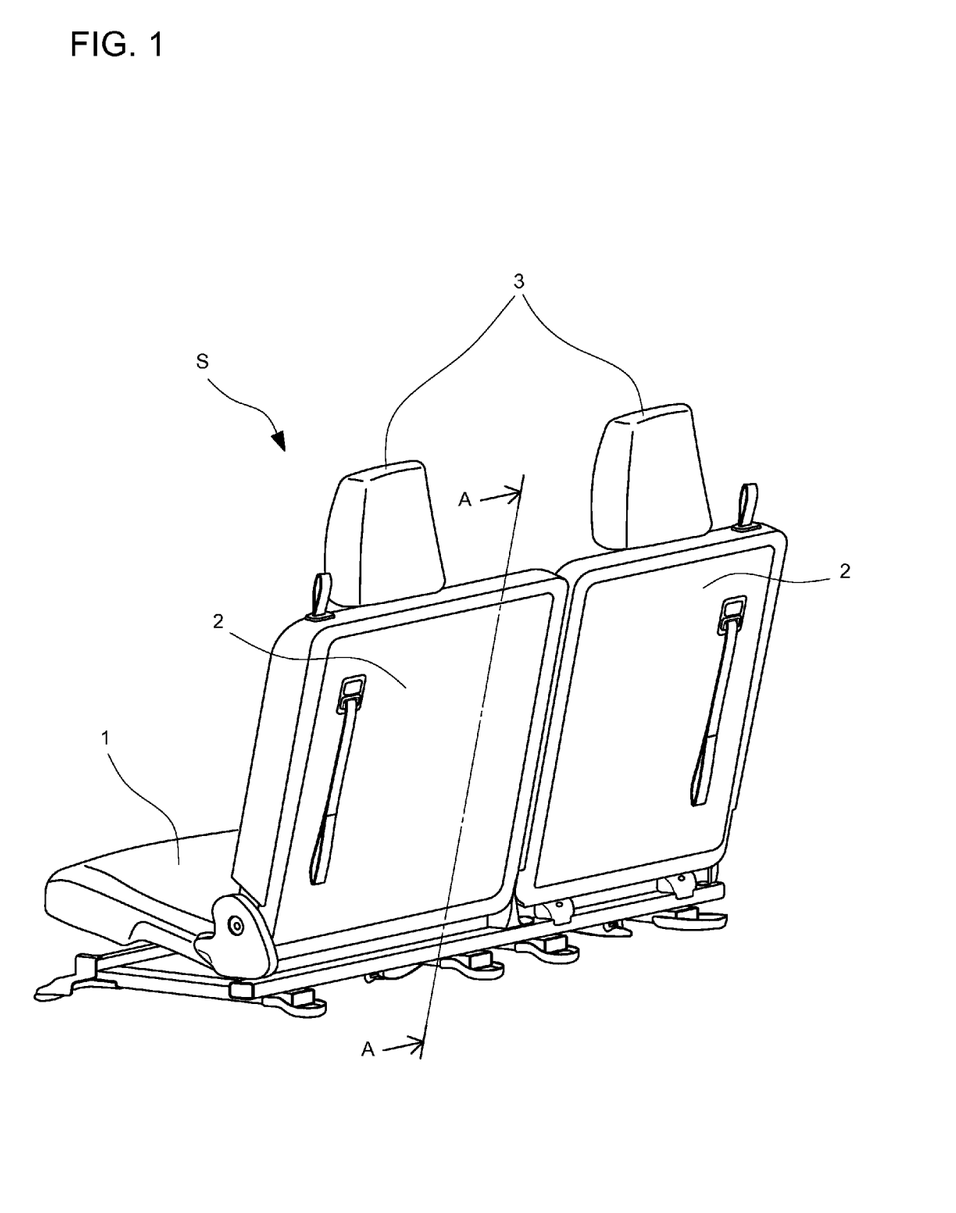
FIG. 1 is a schematic rear perspective view of a vehicle rear seat showing an embodiment of the present invention.

As shown in FIG. 1, a vehicle rear seat S of the present embodiment is mainly formed by a seat cushion 1, a seat back 2 arranged on the back surface side of the seat cushion 1, and a headrest 3 arranged on the upper surface side of the seat back 2.

The vehicle rear seat S can be switched from a normal position where the seat back 2 stands up and a passenger can be seated to a stowed position where the seat back 2 is folded forward to overlie the seat cushion 1 so that a loading platform is formed.

Figure 2:
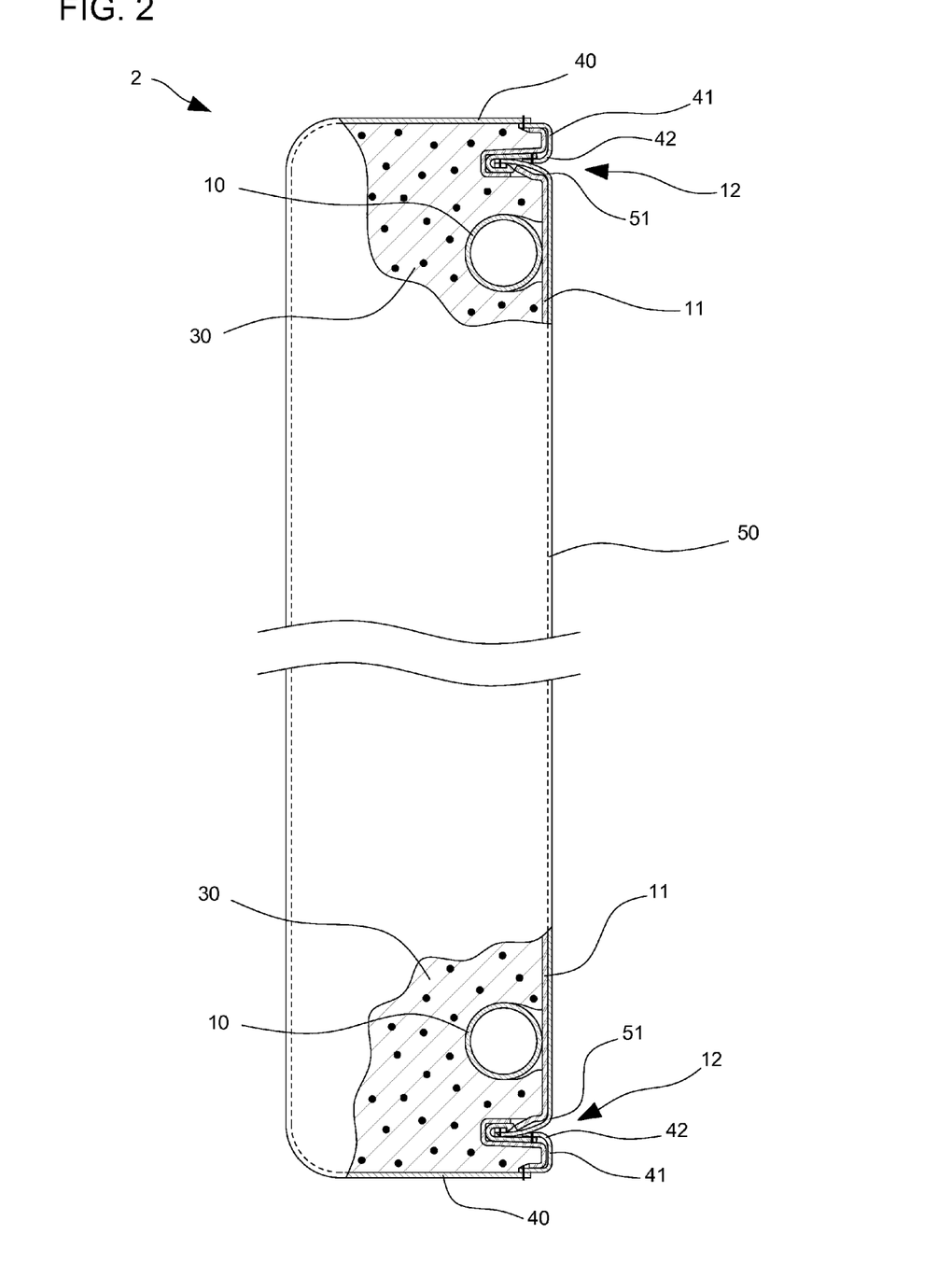
FIG. 2 is a side view of a seat back in FIG. 1 showing the embodiment of the present invention and serving as a partially sectional view.

As shown in FIG. 2, the seat back 2 of the present embodiment is mainly formed by a pipe frame 10, a pan frame 11, a cushion material 30 arranged on the front surface side of the pipe frame 10 and the pan frame 11, a skin 40 for covering the pipe frame 10, the pan frame 11, and the cushion material 30, and a carpet 50 for covering a back surface of the pan frame 11.

The pipe frame 10 and the pan frame 11 correspond to a seat frame in the claims.

The pipe frame 10 is made by a hollow cylindrical metal pipe and formed in a substantially rectangular shape. The pan frame 11 is made of known resin and formed in a substantially rectangular shape along an outer form of the seat back 2.

The pan frame 11 is arranged on the rear side of the pipe frame 10 to surround the pipe frame 10, and welded and fixed to the pipe frame 10.

A tucking groove 12 having a substantially U-shaped section is formed on an entire outer edge of the back surface of the pan frame 11.

Figure 3:
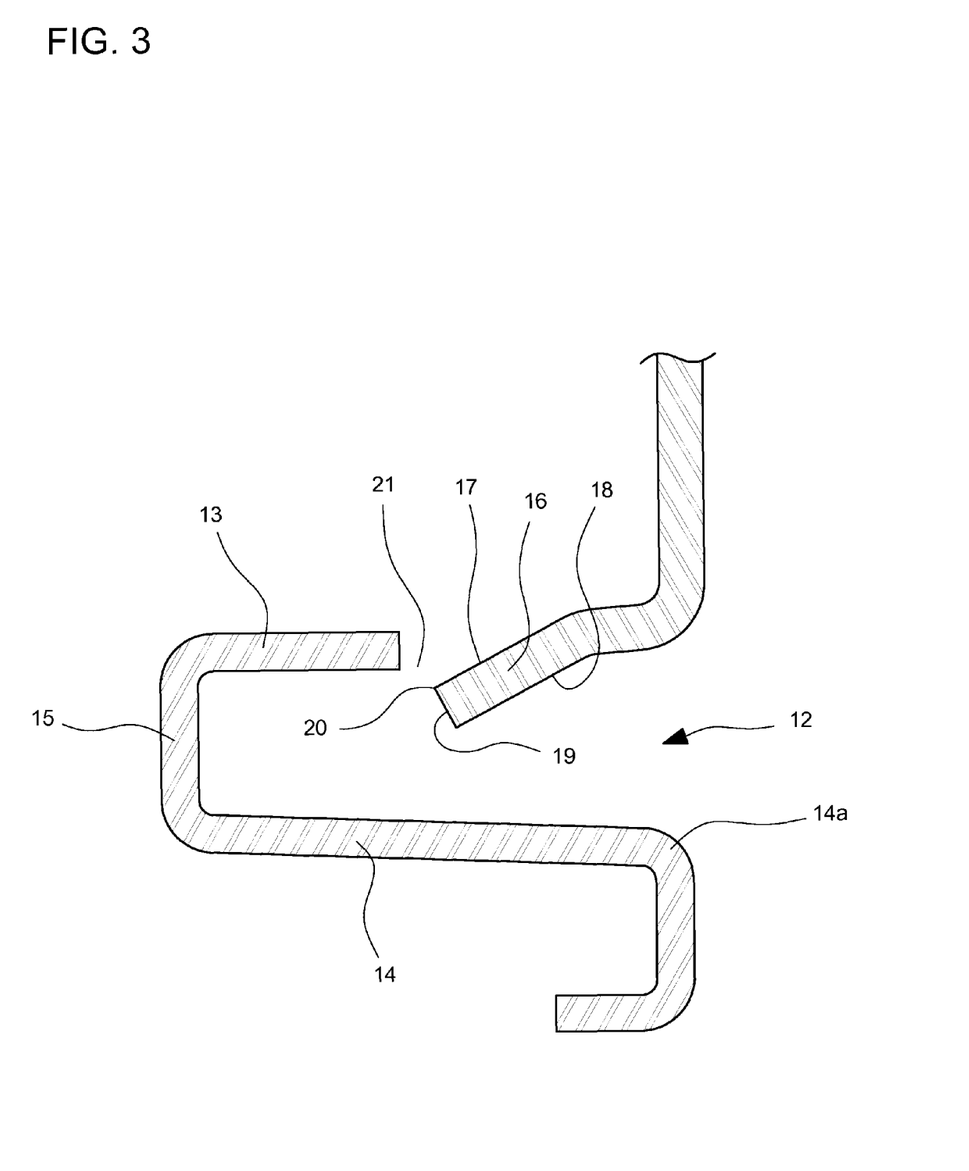
FIG. 3 is an enlarged view of parts of a tucking groove in FIG. 2 showing the embodiment of the present invention.

As shown in FIG. 3, the tucking groove 12 has a substantially U-shaped section, including a substantially plate-shaped first wall portion 13 placed on the center side of the pan frame 11, a substantially plate-shaped second wall portion 14 placed on the outer side of the pan frame 11 and arranged to face the first wall portion 13 substantially in parallel, and a coupling portion 15 for coupling ends of the first wall portion 13 and the second wall portion 14.

It should be noted that although the tucking groove 12 of the present embodiment is arranged over the entire outer edge of the back surface of the pan frame 11, the tucking groove is not necessarily limited to this. The tucking groove may be arranged only on upper and lower outer edges of the back surface of the pan frame 11 or may be arranged only on both right and left outer edges. The tucking groove may be arranged only on an upper, lower, left, or right outer edge, or may be arranged only on a substantial center in the up and down direction or the right and left direction.

Further, although the tucking groove 12 is arranged over the entire outer edge of the back surface of the pan frame 11, a plurality of narrow tucking grooves 12 may be arranged at a predetermined interval on the entire outer edge.

In the first wall portion 13 of the tucking groove 12, a cut and bent portion 16 is formed by cutting and bending a substantial center in the longitudinal direction of the first wall portion 13 over substantially the entire length. The cut and bent portion is formed to protrude toward the side of the facing second wall portion 14 and have an acute angle to the first wall portion 13.

The cut and bent portion 16 includes a substantially plate-shaped body elongated in the longitudinal direction of the first wall portion 13, and has an inner surface 17 on the opposite side of the second wall portion 14, an outer surface 18 on the side of the second wall portion 14, and an end surface 19 on the side of the coupling portion 15.

Although the cut and bent portion 16 of the present embodiment is formed by cutting and bending the substantial center in the longitudinal direction of the first wall portion 13, the cut and bent portion is not limited to this—a part of the first wall portion 13 near the opening side of the tucking groove 12 may be cut and bent.

Although the cut and bent portion 16 is formed by cutting and bending the longitudinal direction of the first wall portion 13 over the substantially entire length, a plurality of narrow cut and bent portions 16 may be formed by cutting and bending at a predetermined interval.

Further, the cut and bent portion 16 may be formed by separately welding and fixing or screw-fastening a substantially plate-shaped body to the first wall portion 13 of the tucking groove 12.

A hole 21 which is a part other than the cut and bent portion 16, and the hole 21 being generated by cutting and bending the cut and bent portion 16 is formed in the first wall portion 13.

The hole 21 includes a clearance elongated in the longitudinal direction of the first wall portion 13.

Although the hole 21 of the present embodiment is formed by cutting and bending the first wall portion 13, the hole is not limited to this but may be formed by separately providing a through hole in the first wall portion 13 or separately providing a concave part.

As shown in FIG. 2, the cushion material 30 includes a seat back cushion material made of a known resin foam or the like to have a substantially rectangular section.

The skin 40 includes a seat back skin of a known material such as fabric, real leather, and synthetic leather. As shown in FIG. 2, the skin 40 is formed to cover the front surface side, the side surface side, the upper surface side, and the lower surface side of the pipe frame 10, the pan frame 11, and the cushion material 30.

A terminal of the skin 40 is formed in a substantially rectangular shape, and a skin piece 41 is arranged over substantially the entire length of an end piece of the substantially rectangular shape. The terminal of the skin 40 and a terminal on the skin 40 side of the skin piece 41 are sewn with a thread.

The skin piece 41 covers one part of the back surface of the pan frame 11 to have a substantially U-shaped section along a shape of the pan frame 11.

The skin 40 and the skin piece 41 correspond to one skin for covering the seat frame.

Figure 4:
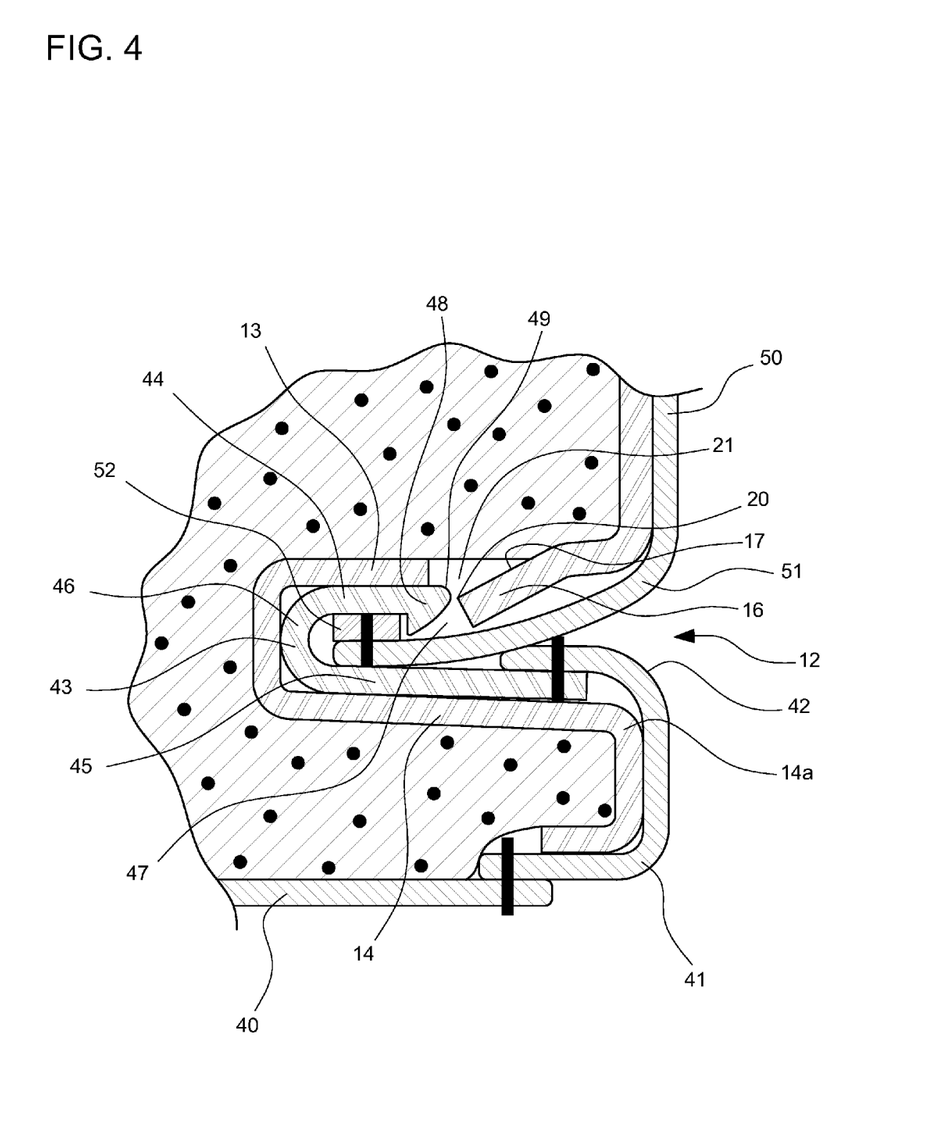
FIG. 4 is an enlarged view of parts of a locking structure for skin terminals in FIG. 2 showing the embodiment of the present invention.

A holding member 43 is arranged in a skin terminal 42 which is a terminal on the opposite side of the skin 40 side of the skin piece 41 over substantially the entire length of the skin terminal 42, and as shown in FIG. 4, a part near a tip end of the holding member 43 on the side of the second wall portion 14 is sewn to the skin terminal 42 with a thread.

The holding member 43 includes a resin body having a substantially J-shaped section, the body being elongated in the longitudinal direction of the tucking groove 12, and formed in a shape in which a substantially plate-shaped first wall portion 44, a substantially plate-shaped second wall portion 45 arranged to face the first wall portion 44 substantially in parallel, and a coupling portion 46 for coupling ends of the first wall portion 44 and the second wall portion 45 are integrated.

The holding member 43 has an internal space surrounded by the first wall portion 44, the second wall portion 45, and the coupling portion 46, and further has an opening portion 47 on the opposite side of the coupling portion 46 of the holding member 43.

Length of the first wall portion 44 is formed to be shorter than length of the second wall portion 45.

Although the holding member 43 of the present embodiment includes the body having a substantially J-shaped section in which the length of the first wall portion 44 is shorter than the length of the second wall portion 45, the holding member is not necessarily limited to this. The holding member may include a body having a substantially U-shaped section in which the first wall portion 44 and the second wall portion 45 have the substantially same length, a body having a substantially H-shaped section in which parts of the first wall portion 44 and the second wall portion 45 other than the ends are coupled, or a body having a substantially n-shaped section in which one ends of the first wall portion 44 and the second wall portion 45 are coupled.

The holding member 43 has flexibility and is formed in a shape spreading more than the width between the first wall portion 13 and the second wall portion 14 of the tucking groove 12. When the holding member 43 is inserted into the tucking groove 12, the first wall portion 44 and the first wall portion 13 are abutted with each other, and the second wall portion 45 and the second wall portion 14 are abutted with each other.

Therefore, the holding member 43 is locked in the tucking groove 12 by a repulsive force of the spread of the first wall portion 44 and the second wall portion 45 in the separating directions.

Although the holding member 43 is formed to be long and arranged over the substantially entire length of the skin terminal 42, a plurality of narrow holding members 43 may be arranged and fixed at a predetermined interval.

The holding member 43 has a projection portion 48 in a front end on the side of the opening portion 47 of the first wall portion 44.

The projection portion 48 has a substantially half-arrow shaped section, and is formed to incline from an end on the opposite side of the coupling portion 46 of the first wall portion 44 to the side of the coupling portion 46 and protrude toward the side of the second wall portion 45. The projection portion 48 is formed at a substantially right angle to the first wall portion 44. A projection portion upper surface 49 is formed in a round shape.

Although the projection portion 48 of the present embodiment is formed at a substantially right angle to the first wall portion 44, the projection portion is not limited to this but may be formed at an acute angle to the first wall portion 44.

Although the projection portion 48 has a substantially half-arrow shaped section, the projection portion may have a substantially flat plate-shaped section. The projection portion may have a substantially arrow-shaped section.

Further, although the projection portion upper surface 49 serving as an upper surface of the projection portion 48 is formed in a round shape, the projection portion upper surface may have a flat surface.

The carpet 50 includes a substantially rectangular plate-shaped seat back carpet formed by a known carpet. As shown in FIG. 2, the carpet is applied and attached to cover the back surface of the pan frame 11.

The carpet 50 corresponds to the other skin for covering the frame.

A carpet terminal 51 serving as a terminal of the carpet 50 is locked in the tucking groove 12 formed on a surface on the back surface side of the pan frame 11.

As shown in FIG. 4, an engagement member 52 is arranged in the carpet terminal 51 over substantially the entire length of the carpet terminal 51 and sewn to the carpet terminal 51 with a thread.

The engagement member 52 includes a substantially plate-shaped resin body elongated in the longitudinal direction of the tucking groove 12.

Although the engagement member 52 of the present embodiment is arranged over substantially the entire length of the carpet terminal 51, a plurality of narrow engagement members 52 may be arranged and fixed at a predetermined interval.

Although the engagement member 52 is sewn at a substantial center of a longitudinal section of the engagement member 52, the engagement member may be fixed by sewing both ends or the like.

The carpet terminal 51 and the engagement member 52 are abutted with and surrounded by the first wall portion 44, the second wall portion 45, and the coupling portion 46 forming the internal space of the holding member 43. Therefore, the carpet terminal 51 and the engagement member 52 are locked in the internal space of the holding member 43.

The width between the first wall portion 13 and the second wall portion 14 of the tucking groove 12 is formed to be small in such a manner that the skin terminal 42 and the carpet terminal 51 are abutted with each other. Therefore, by friction of the skin terminal 42 and the carpet terminal 51, the terminals are further less removable from the tucking groove 12.

The projection portion 48 and the cut and bent portion 16 are close to each other, and the projection portion upper surface 49 is arranged to face a corner portion 20.

Therefore, when a force in the direction in which the holding member 43 is pulled toward the opening side of the tucking groove 12 is applied from the outside, the projection portion upper surface 49 and the corner portion 20 are abutted with each other so that detachment of the holding member 43 can be regulated.

The projection portion upper surface 49 may be a flat surface and a flat surface may be formed in the corner portion 20. In such a way, the surfaces substantially perpendicular to the direction in which the holding member 43 is pulled toward the opening side of the tucking groove 12 are abutted with each other so that the detachment of the holding member 43 can further be regulated.

The projection portion 48 is close to the hole 21, and the projection portion 48 and the hole 21 are arranged to face each other.

Therefore, when the force in the direction in which the holding member 43 is pulled toward the opening side of the tucking groove 12 is applied from the outside, the projection portion 48 is abutted with the cut and bent portion 16 and then moved to the hole 21 side. A slope surface on the opening portion 47 side of the projection portion 48 and the inner surface 17 of the cut and bent portion 16 are abutted with each other so that the detachment of the holding member 43 can further be regulated.

Further, the projection portion 48 and the first wall portion 44 are abutted with the first wall portion 13, and the portions are arranged to face each other.

Therefore, excessive movement of the projection portion 48 to the hole 21 side can be regulated so that a state where the holding member 43 surrounds the carpet terminal 51 and the engagement member 52 can be maintained.

The first wall portion 13 corresponds to a movement regulating portion.

Although the projection portion 48 is close to the cut and bent portion 16 and the projection portion upper surface 49 is arranged to face the corner portion 20, the projection portion is not necessarily limited to this.

As one of other embodiments, the projection portion upper surface 49 may be provided to be abutted with the end surface 19 of the cut and bent portion 16. In such a way, the projection portion 48 is easily moved to the side of the carpet terminal 51 and the holding member 43 can further easily surround the carpet terminal 51 and the engagement member 52. Thus, rigidity of the locking structure can further be improved.

The engagement member 52 is close to the projection portion 48 and arranged so that the engagement member 52 and the projection portion 48 are abutted with each other on surfaces substantially perpendicular to the direction in which the holding member 43 is detached toward the opening side of the tucking groove 12.

Therefore, the detachment of the holding member 43 and detachment of the carpet terminal 51 and the engagement member 52 can further be prevented.

Since the carpet terminal 51 and the engagement member 52 are surrounded by the holding member 43, the fixing strength of the carpet terminal 51 in the tucking groove 12 is improved.

Since the second wall portion 45 of the holding member 43 is arranged to be nipped by the skin terminal 42 and the second wall portion 14, the skin terminal 42 is not easily abutted with a second wall corner portion 14a.

Therefore, even when a force in the direction in which the skin terminal 42 is pushed into the tucking groove 12 is applied from the outside, the skin terminal 42 is not easily damaged by the second wall corner portion 14a.

Although the skin terminal 42 and the carpet terminal 51 are coupled in the tucking groove 12 in the locking structure of the present embodiment, the skin terminal 42 and a terminal of another skin covering the back surface side of the pan frame 11 in place of the carpet 50 may be coupled to each other as one of other embodiments.

That is, the engagement member 52 is sewn to the terminal of the another skin, and this engagement member 52 is surrounded in the tucking groove 12 as well as the above description, and the terminals of the skin 40 and the another skin are coupled to each other.

The skin 40 and the another skin may be made of the same material or may be made of different materials, for example, the skin 40 is made of real leather, synthetic leather, or the like, and the another skin is made of a needle punched material or the like.

As one of other embodiments, in place of the skin 40 and the carpet 50, bag-shaped skin for covering the entire seat back 2 may be used and terminals of the bag-shaped skin may be coupled to each other in the tucking groove 12.

In the above embodiment, the locking structure for the skin terminals mainly in the seat back of the vehicle rear seat is described.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A locking structure for skin terminals of a vehicle seat, comprising:
   a seat frame having a tucking groove on an outer surface;
   a terminal of one skin for covering the seat frame;
   a holding member fixed to the terminal of the one skin;
   a terminal of an other skin surrounded by the holding member; and
   a separation regulating portion on the seat frame for regulating detachment of the holding member;
   wherein:
      the terminal of the one skin and the terminal of the other skin are locked in the tucking groove;
      the holding member is provided with first and second holding member wall portions facing each other, and a coupling portion for coupling the first and second holding member wall portions;
      the first holding member wall portion is provided with a projection portion protruding toward a side of the second holding member wall portion;
      the terminal of the other skin is provided with an engagement member engaged with the projection portion between the first and second holding member wall portions for regulating detachment of the terminal of the other skin from the holding member;
      the projection portion is provided closer to an opening side of the tucking groove than the engagement member;
      the separation regulating portion is arranged closer to the opening side of the tucking groove than the projection portion and provided to be abutted with the projection portion;
      the tucking groove is provided with first and second tucking groove wall portions facing each other;
      the separation regulating portion includes a cut and bent portion provided in either first or second tucking groove wall portions; and
      a front end of the cut and bent portion is positioned between the first tucking groove wall portion and the second tucking groove wall portion.

2. The locking structure for the skin terminals of the vehicle seat according to claim 1, wherein:
   the tucking groove is provided with a guide portion for guiding the terminal of the one skin and the terminal of the other skin into the tucking groove; and
   the guide portion is formed from the separation regulating portion.

3. The locking structure for the skin terminals of the vehicle seat according to claim 1, wherein:
   the tucking groove is provided with a hole formed by the cut and bent portion, and a movement regulating portion provided in the first or second tucking groove wall portion provided with the cut and bent portion;
   the hole and the projection portion face each other;
   the projection portion is arranged at a position where the projection portion is movable to a hole side upon being abutted with the cut and bent portion; and
   the movement regulating portion regulates movement of at least a lower position of the projection portion to the hole side.

4. The locking structure for the skin terminals of the vehicle seat according to claim 1, wherein:
   the projection portion is provided closer to a side of the terminal of the other skin than an end on a hole side of an end surface of the cut and bent portion; and
   the projection portion is provided to be abutted with the end surface of the cut and bent portion.

5. A vehicle seat, comprising:
   the locking structure for skin terminals according to claim 1.

6. The locking structure for the skin terminals of the vehicle seat according to claim 1, wherein:

the tucking groove is provided with a guide portion for guiding the terminal of the one skin and the terminal of the other skin into the tucking groove; and the guide portion is formed from the separation regulating portion and extends from the opening side to an inside of the tucking groove and is inclined in a direction that narrows a width of the tucking groove.

7. The locking structure for the skin terminals of the vehicle seat according to claim 1, wherein:

the front end of the cut and bent portion extends in a direction opposite to the opening side of the tucking groove and faces the projection portion of the holding member.

8. A locking structure for skin terminals of a vehicle seat, comprising:

a seat frame having a tucking groove on an outer surface;

a terminal of one skin for covering the seat frame;

a holding member fixed to the terminal of the one skin;

a terminal of an other skin surrounded by the holding member; and a separation regulating portion on the seat frame for regulating detachment of the holding member;

wherein:

the terminal of the one skin and the terminal of the other skin are locked in the tucking groove;

the holding member is provided with first and second holding member wall portions facing each other, and a coupling portion for coupling the first and second holding member wall portions;

the first holding member wall portion is provided with a projection portion protruding toward a side of the second holding member wall portion;

the terminal of the other skin is provided with an engagement member engaged with the projection portion between the first and second holding member wall portions for regulating detachment of the terminal of the other skin from the holding member;

the projection portion is provided closer to an opening side of the tucking groove than the engagement member;

the separation regulating portion is arranged closer to the opening side of the tucking groove than the projection portion and provided to be abutted with the projection portion;

the tucking groove is provided with first and second tucking groove wall portions facing each other;

the holding member is disposed inside the tucking groove; and the first holding member wall portion contacts the first tucking groove wall portion and the second holding member wall portion contacts the second tucking groove wall portion.

9. The locking structure for the skin terminals of the vehicle seat according to claim 8, wherein:

the engagement member is a separate member from the terminal of the other skin;

the projection portion of the holding member and the engagement member comprise engagement surfaces respectively facing each other; and the engagement surface of the projection portion contacts the engagement surface of the engagement member such that the engagement member is engaged with the projection portion.

10. A vehicle seat, comprising:

the locking structure for skin terminals according to claim 8.

* * * * *